UNITED STATES PATENT OFFICE.

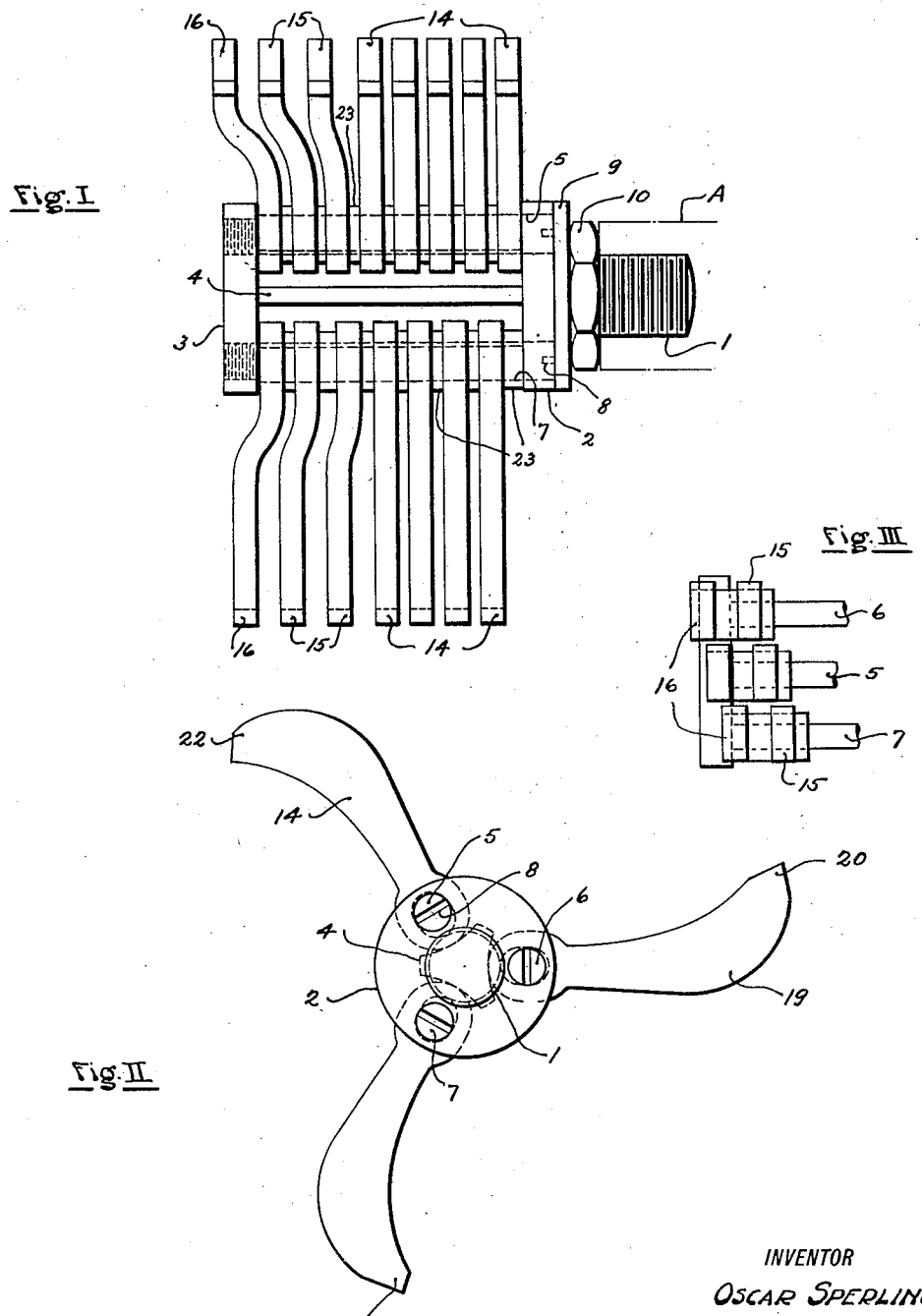

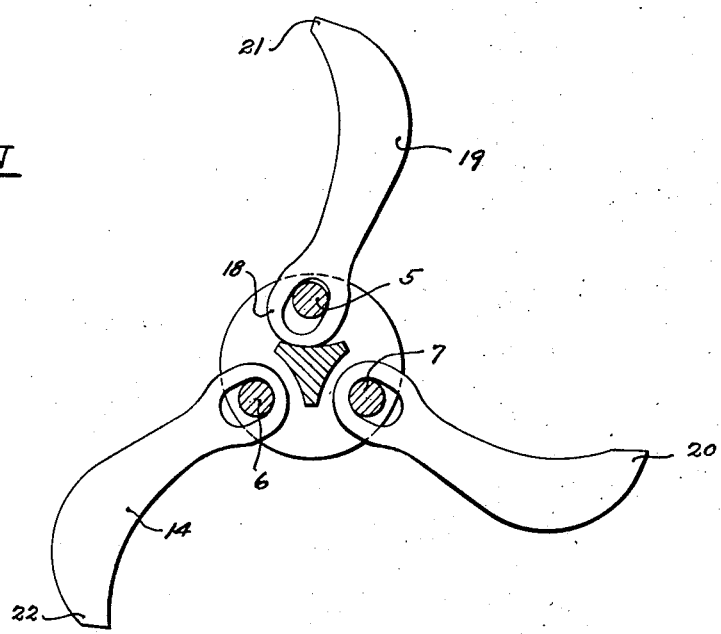
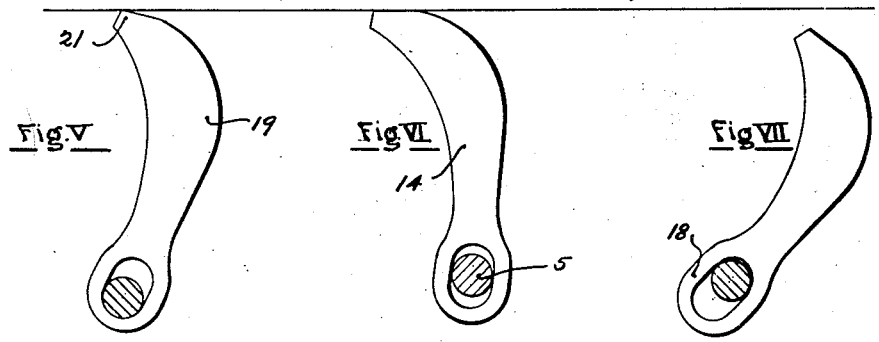
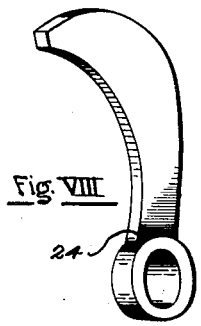

OSCAR SPERLING, OF NEW YORK, N. Y., ASSIGNOR TO ROTARY SCRAPER COMPANY, INC., OF NEW YORK, N. Y., A CORPORATION OF NEW YORK.

PERCUSSIVE IMPLEMENT.

1,370,769.    Specification of Letters Patent.    Patented Mar. 8, 1921.

Application filed February 5, 1918. Serial No. 215,563.

*To all whom it may concern:*

Be it known that I, OSCAR SPERLING, a citizen of Sweden, and a resident of the borough of Manhattan, in the county, city, and State of New York, have invented certain new and useful Improvements in Percussive Implements, of which the following is a specification.

The present invention has reference to instrumentalities adapted for scouring and cleaning metallic surfaces, conduits and containers, whether on the inside or the outside thereof, and regardless of their respective configuration. In a more restricted sense, the invention relates to appliances or implements composed of a number of percussive tools arranged to be swung rotatively and with centrifugal impingement upon the parts subjected to their action.

One of the objects of the invention is to produce an improved implement of the class referred to, including a plurality of operative elements of peculiar design selected with a view to impart the greatest effectiveness to their respective working edges and grouping the same so as to obtain the most satisfactory results.

Another object is the production of an implement of the type set forth equipped with a novel form of striking tools the shape whereof insures the best presentment to the surface to be cleaned when thrown thereagainst through centrifugal action, and the weight of which is so distributed as to augment their kinetic energy.

A further object is to provide an implement of the nature described having loosely mounted striking tools arranged so as to take off the inward stress from their connections upon the rebound, thereby limiting the wear on the parts to one direction.

Still another object is the provision of an implement of the character specified provided with tools of such outline and application that the working edges thereof will be maintained in sharpened condition while in actual operation.

A still further object is to devise an implement of the species mentioned consisting of a comparatively limited number of individual parts, capable of being located in a definite position when put together and all susceptible of quick assemblage and disassociation, as well as convenient to operate and easily maintained in coördinate arrangement.

An additional object is to supply an implement of the genus aforesaid characterized by the open construction, simplicity, compactness, and durability of its component parts, which may severally be standardized and thus will afford great economy in their manufacture.

Other objects and advantages of the invention will become apparent as the specification proceeds.

That the said objects may be achieved, the invention consists of the novel and improved construction, arrangements, combinations and sub-combinations of parts, which are disclosed in the description hereinafter contained, and illustrated by way of example in the accompanying drawings, including further such variations and modifications as come fairly within the scope of the appended claims.

Generally described, the invention comprises a rotatable mounting designed to be coupled by one end to the motion imparting member of a flexible shaft or other suitable power connection. The mounting includes end disks and parallel supports therebetween disposed longitudinally in triangular arrangement. Each of these supports carries a set of striking tools singly and severally oscillatable thereon through rotation of the mounting. The sets of tools are strung upon their respective supports by passing the latter through looped portions of the former. The loops are disposed with their longest dimensions extending axially lengthwise of each tool, so that as the various sets are being oscillated, all of the tools therein will have in addition to the swinging, a radial reciprocative movement on the supports, first moving outwardly due to the centrifugal force developed by the rotary mounting, and receding inwardly subsequent to oscillation. During recession, the looped portions of the tools are encountered by and automatically seated in the depressions of a concavo-triangular bar or stem, located centrally within the mounting and serving to join its said disks together. Individually, the tools are fashioned so as to pick, scrape, and disintegrate the rust, scale, sediment, or other foreign matter adhering to the surface to be cleaned, and they are made of such a shape as will poise them to best advantage for operation, that is, by enabling them to deliver blows at most favorable angle. They are further drawn, at the points of contact, on peculiar lines that render them self-sharpening. Collectively, the tools are grouped at varying distances apart in each set, as also in the several sets, and some of them are curved outward relatively to the mounting, all with the view of spreading their action over the widest possible surface, striking the blows repeatedly at close intervals thereon, and reaching parts of the surface which otherwise would remain inaccessible. The several sets of tools and the supports thereof are distinguished by their open construction, which facilitates elimination of the refuse as the tools successively impinge against the surface to be cleaned.

It may be noted at the outset that the fullest returns are obtained from the practice of the invention when all of its features and characteristics above outlined are embodied in the one implement, although some very useful combinations may be produced by employing a less number of parts than are comprised in the entire structure herein disclosed.

Manifestly, the invention may assume several different forms, and the constituent parts thereof are capable of being combined with one another in implements apparently dissimilar in their nature. It should be observed, therefore, that the drawings hereto annexed represent but one embodiment of the invention, which is believed to be quite sufficient to indicate how it can advantageously be carried out.

Referring to the said drawings, for a detailed description of the invention,—

Figure I is a front elevation of a percussive implement made in accordance with the present improved construction;

Fig. II is an end view of the same, as seen from the right-hand side of Fig. I;

Fig. III is a fragmentary top plan view, showing the implement of similar form as in Fig. I, but on a reduced scale and with certain parts in a changed position;

Fig. IV is an enlarged section taken transversely of the latter-named figure, with some of the parts again in a changed position;

Figs. V, VI and VII are detail views, showing one part of the implement in various operative positions; and Fig. VIII is a perspective view of a similar part involving a slight modification.

Similar elements are denoted by corresponding reference characters throughout the specification and drawings.

The numeral 1 designates an externally screw-threaded shank extending out at right angles from a disk 2, and adapted for insertion in a socket A, such for instance as is provided on the end of a flexible shaft arranged for transmission of power from some suitable source.

Spaced a certain distance from the disk 2, is another disk 3, of substantially the same dimensions, and connected thereto by a central stem, bar, or distance piece 4. The disks, it will be observed, constitute flanges or flange-like members on the opposite ends of the element 4. These parts may be either formed integrally by drop-forging, or machined out of a solid piece of material, or else built up of separate pieces electrically welded together. In their aggregate they constitute an open mounting for the striking tools hereinbefore mentioned, which through the medium of its said shank, insertible in the socket A, is adapted for rapid rotation, effected by revolving the latter from the aforesaid flexible shaft, or otherwise.

The element 4, above referred to, is preferably of trilateral formation, and the sides thereof are made concave or dished inwardly for a purpose which will be more fully referred to hereinafter.

Supported near the periphery of the disks or flanges 2 and 3, at equal distances from the center thereof, and by preference also equidistantly from one another, are spindles 5, 6 and 7. As shown, these spindles are threaded at one end into the disk 3, and driven through the opposite end substantially flush with the outer surface of the disk 2, where they are transversely grooved, as at 8, to receive a screw-driver.

In order to prevent the said spindles from becoming loose or unscrewed, a washer 9 is placed over the shank 1, squarely against their grooved or slotted ends. This washer is held in its assigned position by a nut 10, engaging the threads on the shank.

Upon the three spindles 5, 6 and 7, intermediately of their end disks 2 and 3, are placed as many sets or series of strikers or striking tools, respectively designated by the reference numerals 14, 15 and 16. As seen in Fig. I, the strikers 14 are straight sided, while those numbered 15 and 16 are offset to one side so as to project laterally over or toward the disk 3. The three outermost strikers, indicated by the numeral 16, are offset in graduated amounts. Thus, one of them overhangs the disk 3 for a predetermined distance to wit, sufficiently to reach surfaces to be cleaned that lie beyond the outer face of this disk; the next striker is offset or stepped inwardly a certain increment from the first one; and the following or next striking tool is stepped still farther back. This effect is obtained by curving the body of each one of these strikers 16 in two directions, that is, by giving each a double or reversed curve. The adjoining strikers 15 are also offset, but in a less degree, and are stepped one back of the other. The arrangement is shown to best advantage in Fig. III, where the strikers have been laid all in the same direction, and are viewed from their outer ends.

The inner ends of the strikers 14, 15 and 16, are formed with elongated loops or eyes 18, which loosely take over the spindles 5, 6 and 7, so as to insure for them an easy sliding fit upon the latter in a radial direction, and allow them besides a free swinging motion thereon. This construction of the inner ends of the striking tools and the self-adjustment of their looped portions relatively to the spindles passing therethrough are clearly brought out in Fig. II and in Figs. IV to VII inclusive.

At their rear edges, the strikers 14, 15 and 16 are broadened or swelled out, for instance as at 19, thereby locating a preponderance of metal and corresponding proportion of weight to one side, to wit, rearwardly of what would otherwise be the normal center of gravity in each striker. As a consequence, when under the action of centrifugal force, the strikers are made to assume a certain angle, which is especially advantageous in the performance of work on the surface to be cleaned. Furthermore, due to additional weight thus applied on the strikers, the kinetic energy thereof is increased to a material extent. It is placed where most needed, without interfering with the wear on any tool, which can proceed to a considerable distance inward or down toward its point of attachment and still not appreciably affect the relative positions normally assumed by the strikers while being kept in motion.

For the purpose of producing different effects through impact against the surfaces operated upon, the several striking tools have been given various shapes at their respective points of impingement. Therefore, one striker is shown as having a pick point 20; another, provided with a sharp scraper edge 21; and a third, with a scraping edge 22, inclined at a somewhat more obtuse angle.

The action of the striker 14, against a surface B, is diagrammed in Figs. V, VI and VII. Fig. V illustrates the manner in which the scraping edge 21 attacks the surface. Fig. VI shows how, after the edge 21 has done its work, the outer end of the striker rubs against the part attacked. This mode of operation enables the tool always to maintain itself in a sharpened condition; in other words it becomes self-sharpening. Fig. VII depicts the manner in which the tool, having performed the striking and rubbing process, rebounds away from the surface B, that is, jumps back, as it were, rearward and inward until its looped portion 18 abuts against the subjacent concave side of the stem 4. The inward movement of the striker is then arrested, until the centrifugal force again throws it outwardly into the position represented in Fig. V.

By reason of the fact that the looped portion 18 strikes against the stem 4, the strain which otherwise would come on the spindles 5, 6 and 7, is taken off the latter. Besides, the strikers are prevented from swinging too far back by the outwardly projecting edges of the stem against which the inner ends of the looped portions abut.

As represented in Fig. I, collars 23 are placed sidewise between the looped portions 18, on the spindles 5, 6 and 7. These collars may be of different thicknesses, so as to effect the staggered spacing previously referred to herein.

Fig. VIII illustrates a form of striker provided with hub-portions 24, extending out sidewise from the looped end 18. Obviously, these hub portions may well replace the spacing collars above mentioned.

I am aware that heretofore it has been proposed to make a rust-cleaner consisting of a hub-like device, having end supports with transverse pins carried by the latter, and cutting blades radially pivoted on these pins, the blades being formed with openings larger than the diameter of the pins and thereby enabled to part.ke of a reciprocating movement on the same. It is not apparent, however, that this device has ever been put into practical shape and offered to the public at large for either sale or use. It differs essentially from the present invention, first, in the defective shape of the blades, which are incapable of performing the work of the tools hereinbefore described; and secondly, in that it affords no means of properly checking the action of the blades upon the pins on the rebound, after being subjected to the action of the centrifugal force developed by the rapid rotation of the hub-like member.

Having described my invention, what I desire to secure by Letters Patent, and claim, is:—

1. A percussive implement including, in combination, a series of supporting elements arranged equidistantly in triangular formation, a rotatable mounting therefor, tools longitudinally slotted at one end for a loose pivotal and reciprocatory connection with said supporting elements, and a relatively fixed concavo-trilateral member arranged to meet the inner ends of said tools as they are inwardly reciprocated.

2. A percussive implement including, in combination, a centrifugally actuated reciprocating tool weighted to locate its center of gravity rearwardly of the median longitudinal plane thereof, a supporting element passing loosely through a loop in the inner end of said tool, a rotatable mounting for said element, and a member operating to arrest the inward movement of the tool by contact with its said inner end.

3. A percussive implement including in combination, a mounting composed of flange-like carriers, a polygonal stem formed with dished sides holding said carriers apart, spindles supported by the carriers substantially opposite the dished sides of said stem, and centrifugally actuated tools having slotted shanks taking around said spindles, the distance from the outer ends of the slots in said shanks to the dished sides of the stem being greater than that from the dished sides to the outwardly disposed faces of the spindles, so that upon rebound of the tools, the inner portions of their shanks will be received by the dished sides and the spindles are relieved of direct concussion.

4. A percussive implement including, in combination, a rotatable mounting, a supporting element carried thereby, and centrifugally actuated radially reciprocating tools having a loose pivotal connection with said element, part of said tools being straight-sided and the others overhanging their said connection.

5. A percussive implement including, in combination, a plurality of supporting elements, radially reciprocating tools arranged to overlap one another in step formation thereon, said elements passing through longitudinal slots of said tools, and a mounting for the elements adapted for rapid rotation.

6. A percussive implement including, in combination, a rotatable mounting, a supporting element carried thereby, and a series of striking tools radially slotted for loose connection to said element, one or more of said tools being reversely curved to cause the same to overhang toward one end of said mounting.

7. A percussive implement including, in combination, a supporting element, a rotatable mounting for the same, and a series of radially reciprocable tools on said element, part of said tools being straight-sided and the others reversely curved in graduated amounts.

8. A percussive implement including in combination, a rotatable mounting with a plurality of supporting spindles, centrifugally actuated tools having slotted shanks taking around said spindles, and a concaved arresting member located substantially centrally of said mounting intermediate of the shanks of said tools, the arrangement being such that the ends of the shanks abut against the deeper portions of said member during inward rebound of the tools to prevent the outer ends of the slots from contacting with the spindles, the projecting edges of the member serving to limit the rearward swing of the outer ends of the tools.

9. A percussive implement including in combination, a rotatable mounting with a plurality of spindles, centrifugally actuated tools having slots in their shanks loosely engaging said spindles, said tools being substantially crescent-shaped with the convex portions thereof turned rearwardly relatively to the direction of rotation, and a polygonal dished bar extending axially of said mounting intermediately of the slotted shanks of said tools, the arrangement being such that the outer ends of the latter are enlarged or weighted to cause them to assume a certain position when striking the surface to be cleaned, the inner ends of said shanks being arrested by the dished portions of said bar during the retrogressive movement of the tools.

10. A percussive implement including in combination, a rotatable stem having a plurality of dished sides, carriers at the ends thereof, spindles supported in spaced relation opposite said sides by said carriers, said stem, carriers and spindles constituting an open mounting, and centrifugally actuated tools with slotted shanks taking around the spindles, said tools being concaved at their front edges in the direction of rotation and convexly curved rearwardly, whereby said mounting with the tools thereon are rendered self-clearing and the inner ends of said shanks are enabled upon the rebound to recede into the dished portions of the stem so as to be arrested thereby without interference from refuse scraped off the surface being cleaned.

OSCAR SPERLING.